May 1, 1928.
G. F. EGAN
1,668,109
DISPLAY DEVICE
Filed Aug. 3, 1925
2 Sheets-Sheet 1
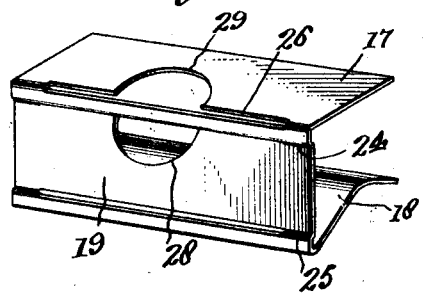
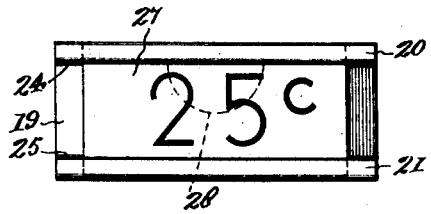
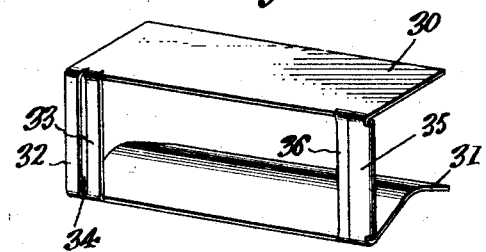
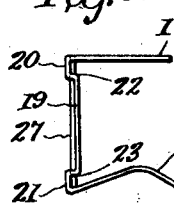
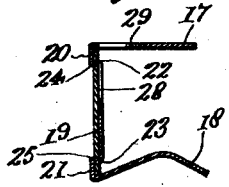
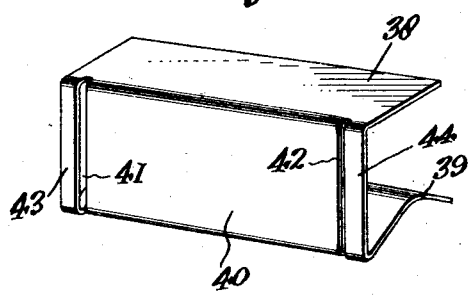
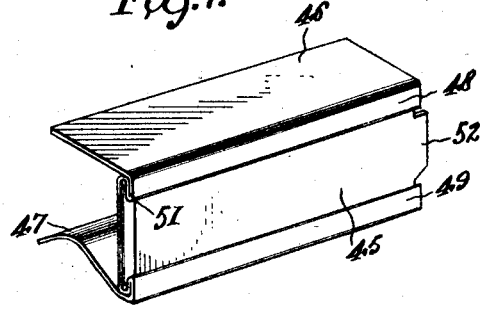
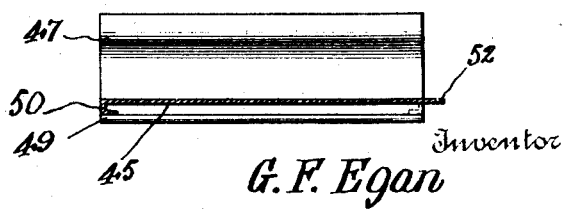
Inventor
G. F. Egan
by James R. Bowen
Attorney May 1, 1928. 1,668,109
G. F. EGAN
DISPLAY DEVICE
Filed Aug. 3, 1925 2 Sheets-Sheet 2
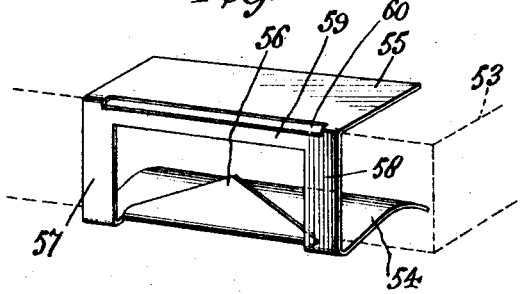
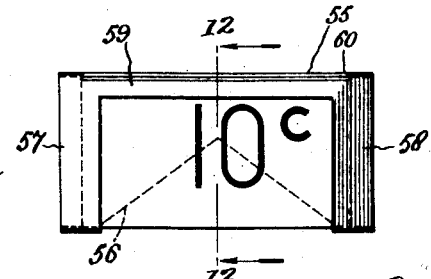
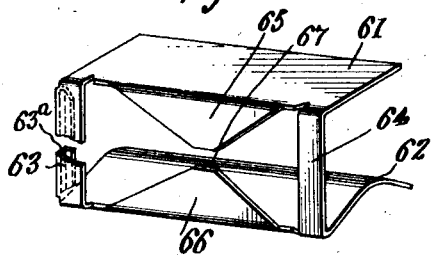
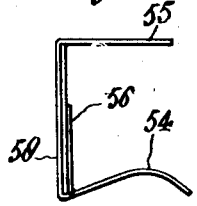
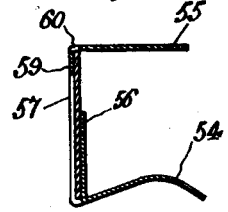
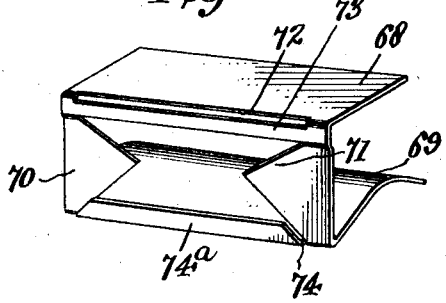
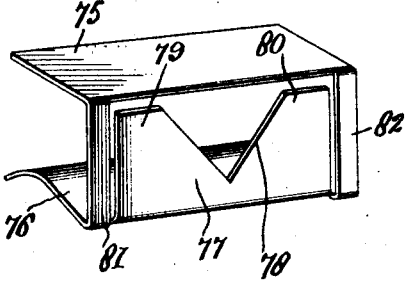
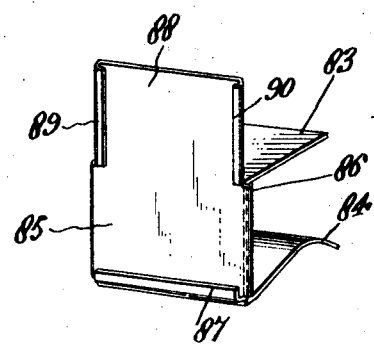
Inventor
G. F. Egan
by James R. Bowen
Attorney Patented May 1, 1928.

1,668,109

UNITED STATES PATENT OFFICE.

GEORGE F. EGAN, OF JERSEY CITY, NEW JERSEY.

DISPLAY DEVICE.

Application filed August 3, 1925. Serial No. 47,865.

The present invention relates to improvements in display devices and more particularly refers to devices designed for use in connection with display or storage shelves upon which merchandise is carried.

It is an object of the invention to provide a simple, structural holder susceptible of inexpensive manufacture and involving the use of small amounts of material, wherein a card or tag may be easily fitted or removed.

Further objects of the invention are to construct a device which may be readily received upon the edge of a shelf and supported in such a way as to not encroach upon the shelf space; to make the device fast to the shelf without the aid of any separate securing means, and to provide a device which may be slid along the shelf to various positions.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a perspective view showing one form of the improved device;

Figure 2 is a front view of the same showing a price card therein;

Figure 3 is an end view of the same;

Figure 4 is a central cross sectional view therethrough;

Figures 5, 6 and 7 are perspective views showing different modifications of the invention;

Figure 8 is a longitudinal horizontal section taken through the device shown in Figure 7;

Figure 9 is a perspective view of a still further modified form of the invention shrown as applied to a shelf;

Figure 10 is a front elevation thereof with a price card therein;

Figure 11 is an end view of the same;

Figure 12 is a cross section taken on the line 12—12 in Figure 10; and

Figures 13, 14, 15 and 16 all show perspective views of further different modifications.

Referring more particularly to the drawings and for the present to Figures 1 to 4, inclusive, the device is shown as made preferably from sheet metal or some other material possessing resiliency and having the upper and lower clamp members 17 and 18 extending rearwardly from the upper and lower edges respectively of the central panel or web 19. The panel is shown as setting back slightly from the edge portions 20 and 21; in other words the edges 20 and 21 are shown as pressed outwardly from the panel and slots 22 and 23 are shown as provided for the major portion of the length thereof except that the end parts 24 and 25 are left. A third slot 26 is shown as provided above the slot 22. A card, as 27, may slide freely up and down through the slots 22 and 26 and in front of the panel 19 and rest upon the forward portion of the lower clamp member 18. Cut-out portions 28 and 29 are shown as made in the panel 19 and upper clamp member 17 respectively and with the open parts of the cut-out portion facing toward one another, or in other words, communicating respectively with the slot 22 and the slot 26. These cut-out portions admit a finger for the purpose of aiding in moving and gripping a card.

A card may be inserted into the slot 26 and slid through the slot 22 and in front of the panel 19 and rest upon the forward portion of the lower clamp member 18, or if desired the card may be inserted in the slot 22 and slid through the slot 26, and the card may then be brought down until it rests on the forward portion of the lower clamp member 18.

In the use of the device the clamp members 17 and 18 are fitted over the edge of a shelf and the device pushed in until the panel member 19 strikes the forward edge portion of the shelf. The inherent elasticity in the metal will cause the clamp members 17 and 18 to tightly grip the shelf without the aid of other fastening means, but at the same time the construction admits of the device being slid along the shelf to various positions. When the device is in position on a shelf the slots permit the admission and removal of cards. When it is desired to remove a card the card may be shoved up from the front of a finger admitted downwardly through the cut-out portion 29 and behind the card through the cut-out portion 28 so that finger pressure may be obtained on opposite faces of the card.

Referring to Figure 5, clamp members 30 and 31 are shown as provided for the purpose of securing the device upon a shelf, but in this instance the panel member is dispensed with and the device may be made lighter and material saved. The clamp members are shown as connected together at one end by the outer and inner straps 32 and 33 respectively which are offset in different planes to provide a slot 34. The other end of the device is shown as provided with the outer and inner straps 35 and 36 of similar construction except that the strap 36 is bent backwardly and inwardly. A card may be slid between the straps 35 and 36 until it enters the slot 34, in which position the strap 33 as well as the strap 36 will be behind the card and the straps 32 and 35 will be in front of the card.

Referring to Figure 6, 38 and 39 designate the clamp members for holding the device upon a shelf and 40 a panel member which is in one piece with the clamp members. The panel member is shown as slotted at 41 and 42 substantially parallel with the ends thereof and near such ends, the slots running in a substantially vertical direction. Straps 43 and 44 are shown as left beyond the slots, and the panel 40 may be pressed inwardly from the straps 43 and 44, or the straps 43 and 44 may be pressed outwardly from the panel 40, in either case to admit a card when slid horizontally into the holder between the straps and the panel. The end of the strap 43 may be bent around to form an abutment to check the movement of the card towards the left.

Referring now to Figures 7 and 8, a panel member is represented at 45 and clamp members at 46 and 47. Beads 48 and 49 are shown as made between the upper and lower edges of the panel member and respective clamp members. These beads are shown as overhanging the panel member and provide upper and lower guides in which a card may be slid horizontally. At one end the guides are open to admit the card, but at the other end such guides may be closed by a flange, as 50, which may be rolled forwardly and inwardly as indicated in Figure 8. This flange may be a portion of the metal of the panel and the upper and lower ends of the part 50 are preferably received and housed within the adjacent end parts of the upper and lower beads. The beads extend substantially vertically, being also substantially parallel and forwardly of the panel 45. The beads are shown as reinforced by inner overlapping walls 51 which lie in contact with the rear walls of the beads and are bent over and merge with the top and bottom portions of the panel. In other words the beads are shown as of double-wall construction. The end of the panel at the open end of the guide ways is shown as provided with an extension 52. If goods hang over the edge of a shelf the device may be removed from the shelf without moving the goods by inserting a finger nail or, for instance, a knife blade behind the extension 52.

Referring now to Figures 9 to 12, inclusive, a shelf is represented by dotted lines at 53. The flange members 54 and 55 are shown as engaging the upper and lower walls of the shelf and a V shaped partial panel 56 is shown as extending upward from the lower clamp member 54. This partial panel 56 may rest against the front wall of the shelf when the device is in position on the shelf. Side strips 57 and 58 are shown as connecting the lower and upper clamp members at the ends of the device, and a horizontal strip 59 is shown as extending between the strips 57 and 58. A slot 60 is shown as provided for the insertion of a card. A card inserted in the slot 60 will be held in place by the strips 57 and 58 and the partial panel 56, the strips 57 and 58 preventing the card from falling frontward and the partial panel 56 preventing the card from falling backward. The downward movement of the card is checked at the points where the side strips 57 and 58 and the clamp member 54 merge.

Referring to Figure 13, 61 and 62 designate the clamp members and 63 and 64 end vertical straps that secure the clamp members 61 and 62 together. Two partial V shaped panels 65 and 66 are shown in this instance, the V's being shown as inverted with respect to one another and the points being preferably removed as indicated at 67 to avoid any sharp corners coming in contact with the card. The partial panels 65 and 66 are in a plane back of the straps 63 and 64. The card is intended to be slid in horizontally. In this instance the straps 63 and 64 will prevent the card from falling forward and the partial panels 65 and 66 will prevent the card from falling backwardly. The horizontal movement of the card may be checked by a stop 63ª shown as formed by turning rearwardly and inwardly a portion of the strap 63.

Referring to Figure 14, the clamp members 68 and 69 are shown as connected by straps 70 and 71 substantially V shaped and having their points extending towards one another. In this construction a strap 73 is shown as provided forming a slot 72. A slot 74 is provided in which a card may be inserted. The card is intended to be inserted in front of the straps 70 and 71 and to rest in the slot 72. The card will be held against falling forward by the horizontal ledge 74ª. In this form of construction a card may be placed in position by inserting it downwardly through the slot 74 or the card may be inserted by inserting it upwardly behind the ledge 74ª and then resting it in the slot 72.

Referring to Figure 15, 75 and 76 are the clamp members and 77 the panel shown as made in one piece with the lower clamp member and bent upwardly therefrom having a V-shaped slot 78 and two end prongs 79 and 80.

Straps 81 and 82 are left at the sides of the device and the panel member is pressed backwardly of the strap so as to admit the card therein by horizontal sliding movement. One of the straps may be provided with a curled abutment such as shown at 50 in Figure 8 or at 37 in Figure 5.

Referring now to Figure 16, the device comprises clamp members 83 and 84 with a panel therebetween. A holding panel 85 is shown as attached to the panel between the clamp members 83 and 84 by curling the ends 86 of the panel 85 around the edges of the panel formed between the clamp members 83 and 84. The panel 85 has a lower upturned ledge 87 and an extension part 88 extending above the upper clamp member 83. The extension 88 is provided with curled vertical guides 89 and 90. A card may be admitted downwardly between the curled guides 89 and 90 and rest upon the ledge 87. This device accommodates larger and higher cards.

I prefer to make the lower clamp members in the embodiment of my invention shown in the drawings taper upwardly at the points where they project from the panels and taper downwardly at the ends of the clamp members. In this way it is easier to insert my device on a shelf. The device will accommodate itself to shelves of varying thicknesses, and the device will hug the shelf more closely.

It is obvious that various changes and modifications may be made in the details of construction and design of the above specifically described embodiments of my invention without departing from the spirit thereof.

What is claimed is:—

1. A display device comprising a panel to receive a card thereagainst, supporting means connected to the panel having slots to admit the card, said panel and supporting means having cut-out portions to admit a finger to the rear side of the card supported in front of the panel.

2. A sheet metal display device comprising a pair of substantially parallel clamp members for holding the display device upon a support, one of said clamp members having a portion thereof bent toward the other clamp member, a strap extending forwardly in spaced relation from the upper clamp member and extending below the plane of said clamp member and forming with said clamp member a slot closed at its ends for receiving downwardly a display card, connecting means between said clamp members offset from said slot and strap for bracing the card from behind, a ledge extending outwardly and upwardly from the lower clamp member for receiving and holding the lower edge and outer portion of said card.

In testimony whereof I affix my signature.

GEORGE F. EGAN.